July 15, 1958 R. H. OKADA 2,843,764

SEMI-CONDUCTOR STABILIZING CIRCUIT

Filed Feb. 20, 1953

INVENTOR
ROBERT H. OKADA
BY Ralzemond B. Parker
ATTORNEY

United States Patent Office 2,843,764

Patented July 15, 1958

2,843,764

SEMI-CONDUCTOR STABILIZING CIRCUIT

Robert H. Okada, Bryn Mawr, Pa., assignor to Burroughs Corporation, a corporation of Michigan Application February 20, 1953, Serial No. 337,981

2 Claims. (Cl. 307—88.5)

This invention relates generally to semi-conductors and more specifically to circuitry adapted to adjust the operating characteristics of semi-conductors known in the prior art as transistors to a uniform standard.

Transistors have been utilized in many applications which otherwise would require other devices such as vacuum tubes, glow discharge devices, or gas tubes. Many advantages are to be found in the use of transistors such as smallness of size, low power consumption, and long life. With present methods of making transistors, however, it is difficult to obtain transistors having uniform operating characteristics. Such uniformity is desirable in many type transistor circuits as for example monostable and bistable circuits. In one type transistor circuit which can be utilized as a bistable or a monostable circuit, the emitter voltage vs. emitter current characteristic has a negative resistance portion and, on either side thereof, a positive resistance portion. Consequently, the emitter voltage has a high peak and a low peak. These peaks represent trigger voltage values which vary considerably with different transistors. Since it is desirable that such peaks be uniform in a given group of monostable or bistable circuits utilizing transistors, it would mark an improvement in the art to provide means whereby said peaks could be standardized to a predetermined value.

An object of the present invention is to provide means to adjust the varying operating characteristics of different transistors to a substantially uniform standard.

Another object of the invention is to control the lower peak of the emitter voltage-current characteristic so that the transistors having different operating characteristic curves will have subsantially similar values of low peaks.

A further object is to provide means to facilitate wider use of transistors having varying operating characteristics.

A fourth object of the invention is the improvement of transistor circuits generally.

In one embodiment of the invention a circuit including a transistor having an emitter terminal, a base terminal, and collector terminal is used. An impedance means has a first terminal connected to the base terminal. A potential means is connected between the second terminal of the impedance means and the emitter terminal and is adapted to bias the emitter electrode negative with respect to the second terminal of the impedance means. Another potential means is connected between the second terminal of the impedance means and the collector electrode and is adapted to bias the collector electrode negative with respect to the base electrode.

The presence of the impedance means creates an emitter voltage emitter current operating characteristic curve, a portion of which has a negative resistance characteristic with portions on either side thereof having a positive resistance characteristic. Across said impedance means which functions as a feedback means to the emitter circuit there is connected the series combination of an asymmetrical device and a potential means. The said asymmetrical device is so connected as to present a low impedance to electron current flowing from the said base terminal and is adapted, in cooperation with said potential means, to become conductive when said base terminal potential decreases to a certain predetermined value thus preventing the base terminal potential from decreasing below a certain value. The emitter voltage is also thereby prevented from decreasing below a certain value determined by the potential of the base electrode and the potential drop across the base terminal to emitter terminal.

In accordance with one feature of the invention, the above described structure for controlling and standardizing the lower peak or turning point of the emitter voltage-current characteristic is combined with structure adapted to control and standardize the upper peak or turning point of the emitter voltage-current characteristic. This latter structure comprises the series combinaion of a second asymmetrical device and a second potential means connected across the base terminal load resistance in such a manner that the said second asymmetrical device presents a high electron current impedance to the said base terminal and a low electron current impedance to the said battery source so that when the base terminal increases to a certain potential the said second asymmetrical device will become conductive.

These and other objects and features of the invention will become more fully understood from the following detailed description when read in conjunction with the drawings in which.

Figure 1:
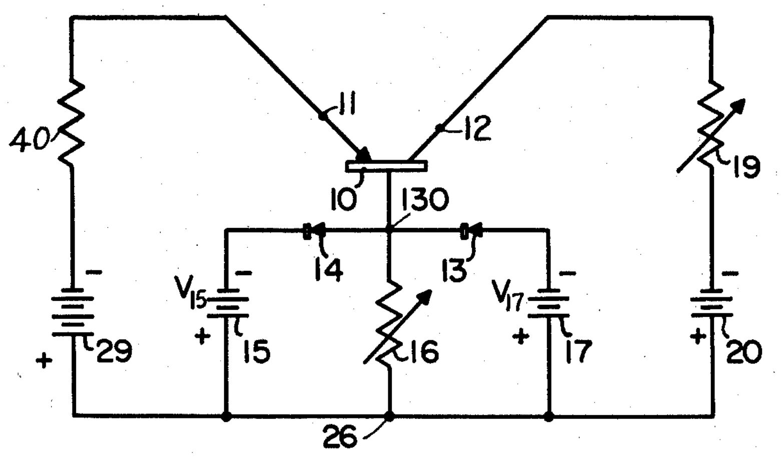
Fig. 1 is a schematic sketch of a preferred embodiment of the invention.

Referring now to Fig. 1, transistor 10 has a base terminal 130, an emitter terminal 11, and a collector terminal 12. Base variable resistor 16 functions to create a negative resistance portion in the operating characteristic curve of Fig. 2. Collector variable resistor 19 functions as a load resistor and further functions to determine the slope of the negative resistance portion of Fig. 2. The larger the resistance of resistor 19, with respect to resistor 16, the smaller will be the slope of the negative resistance portion of the operating characteristic curve of Fig. 2. Battery 20 provides a means to bias the collector terminal 12 negative with respect to the base terminal 130. The resistance of resistor 40 determines the slope of the load line 31 of the emitter voltage vs. emitter current operating characteristic curves shown in Fig. 2. The potential of battery 29 determines point 43 of Fig. 2 where the load line 31 intersects the ordinate and further biases the emitter terminal 11 negative with respect to the point 26. It can be seen that the load line 31 intersects the curve of Fig. 2 at the three points 35, 44, and 36. This will give bistable operation as will be explained later. If, however, the potential of emitter 11 is made more negative so that a new load line 33 is formed which intersects the curve of Fig. 2 only at point 37, the circuit of Fig. 1 will be a monostable device.

Asymmetrical device, or diode 14 has its anode connected to the base terminal 130 of transistor 10. Battery 15 has its negative terminal connected to the cathode of diode 14 and its positive terminal connected to the point 26. The structure comprising diode 14 and battery source 15 functions as a voltage clamping means to limit the maximum potential to which the base terminal 130 and the emitter terminal 11 may rise.

The asymmetrical device, or diode 13 has its cathode connected to the base terminal 130. Battery 17 has its negative terminal connected to the anode of diode 13 and its positive terminal connected to the point 26. This structure comprising the asymmetrical device 13 and the battery 17 functions as a voltage clamping means to limit the minimum potential to which the base electrode 130 and the emitter electrode 11 can decrease.

In one preferred embodiment of the invention the circuit constants may have the following values: resistance 40 has a value of approximately 5000 ohms, variable resistance 16 has a maximum value of about 15,000 ohms, variable resistance 19 a maximum value of about 10,000 ohms, battery source 29 has a value of about 6 volts, battery source 20 has a value of about 15 volts, battery source 15 has a value of about 5 volts, and battery source 17 has a value of about 10 volts.

Figure 2:
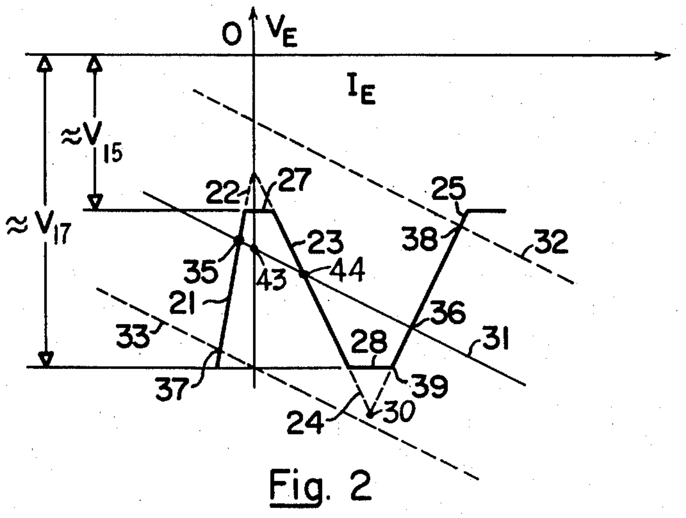
Fig. 2 is a curve showing the emitter voltage-current characteristic of a transistor without the standardizing circuit and also with the standardizing circuitry.

Referring now to Fig. 2, the curve identified by reference characters 21, 22, 23, 24, and 25 represents the emitter voltage-current characteristic of a transistor without the operating characteristic standardizing circuitry. The curve identified by reference characters 21, 27, 23, 28, and 25 represents the emitter voltage-current characteristic of a transistor with the characteristic standardizing circuitry described herein. Load line 32 represents approximately the level to which the load line 31 is temporarily raised to shift the operating point from point 35 to point 36. Load line 33 represents approximately the level to which the load line 31 is temporarily lowered to shift the operating point from point 36 to point 35. It is to be noted that it is only necessary to get the load lines 32 and 33 above and below the portions 27 and 28 respectively of the curve of Fig. 2 in order to shift the operating point. $V_{15}$ is approximately the potential of battery 15 of Fig. 1 and $V_{17}$ is approximately the potential of battery 17 of Fig. 1.

The operation of the structure shown in Fig. 1 will now be described in detail.

It can be seen from an inspection of the curve of Fig. 2 that the intersection of load line 31 with the portion 23 of the curve represents an unstable operating point. As indicated herein before, by increasing or decreasing the emitter voltage substantially, the effective load line can be made to exist as indicated by either line 32 or line 33. The load lines 32 and 33, it will be observed, go beyond the high and low peaks represented by the portions 27 and 28 of the curve of Fig. 2.

It is necessary to increase, make more positive, the potential of emitter 11 to shift the load line to the position indicated by line 32 in order to shift the operating point from portion 21 of the curve to portion 25 of the curve. As mentioned hereinbefore, in order to design monostable and bistable trigger circuits with reasonable trigger requirements, the location of the high peaks and low peaks must be reasonably accurately known. Ordinarily, the high peak and the low peak for a given transistor is variable depending upon individual transistor characteristics. The circuitry shown in Fig. 1 definitely determines the high and low peaks of the transistor substantially independently of its internal characteristics. Assume that the circuit of Fig. 1 is operating at point 35 where load line 31 intersects portion 21 of the curve. By means of asymmetrical device 14 and battery source 15, the high peak is caused to be at a voltage level represented by portion 27 of the characteristic curve. As long as the emitter current is such as to cause operation at point 35, the potential of base terminal 130 will be the potential of the emitter plus a small voltage drop across the emitter-base terminal. This potential will be less than the potential of the negative terminal of battery source 15 and no current will flow through asymmetrical device 14. If the emitter voltage is increased so as to raise the load line to a level represented by load line 32 and which is above the potential of the portion 27 of the characteristic curve the emitter current will traverse the characteristic curve and come to rest on stable point 38. When the emitter voltage is reduced to the normal operating value, the emitter current is indicated by point 36 which is the intersection of load line 31 and portion 25 of the curve. It is to be noted that although only the characteristic curve of one transistor is shown in Fig. 2, that the characteristic curve of any transistor having the type characteristic curve shown in Fig. 2 could have the value of its high peak determined in the manner described above.

To standardize the low peak of a transistor characteristic curve asymmetrical device 13 and battery source 17 are provided. Normally the load line must be lowered to a position such as indicated by line 33 in order to clear the apex point 30 and cause the operating point to shift from portion 25 of the curve to portion 21 of the curve. However, with the addition of asymmetrical device 18 and battery source 17, the low peak is established at portion 28 of the characteristic curve in the following manner. As long as the emitter current is as indicated at point 36 the base terminal voltage (which is equal to the emitter potential minus the potential drop across emitter to base terminals of the transistor) is more positive than the potential of the negative terminal of the battery source 17 and consequently no current will flow through asymmetrical device 13. If, however, the potential of base terminal 130 is lowered to a point less than the potential of the negative terminal of battery source 17, then a current will flow through asymmetrical device 13 and battery source 17 to prevent the emitter voltage from decreasing below the value indicated by portion 28 of the curve of Fig. 2. In order to satisfy the new load caused by the decrease of the emitter voltage and represented by line 33, the emitter current and emitter potential will be defined by point 37 which is at the intersection of the load line 33 and the portion 21 of the curve of Fig. 2. When the emitter potential is returned to normal (represented by load line 31), the emitter current will be as indicated by point 35. It can thus be seen that the low peak of transistors having varying characteristics can be reshaped to be standard.

It is to be noted that the emitter current does not follow the characteristic curve when it switches between points 35 and 36 but rather follows transient paths lying between the characteristic curve and the dotted load lines 32 and 33.

As stated hereinbefore the slope and coordinate position of the portion 25 of the curve of Fig. 2 can be altered by changing the values of the resistances 16 and/or 19. Thus, the portions 25 of a given group of transistors can be caused to pass through a common point 39. Consequently, to a certain extent the slopes of the characteristic curves of said group of transistors can be made to be approxmately in coincidence by proper adjustment of the resistances 16 and 19.

When in operation as a bistable device, the operating positions are represented by points 35 and 36 which can alternately be obtained by increasing and decreasing the emitter voltage so that the effective load lines rise and fall above and below the portions 27 and 28 of the curve of Fig. 2.

When in operation as a monostable device, the potential of battery 29 is chosen so as to make load line 33 the normal operating load line. Then, if the potential of the emitter is raised, made more positive, to shift the operating load line to coincide with load line 32, the operating point will shift from point 37 to point 38. When the potential of the emitter is reduced, made more negative, so that the operating load line returns to the level represented by load line 33, the operating point will return to point 37.

It is to be noted that the embodiments of the invention described herein are but preferred examples of the same and that various changes may be made in circuit constants and circuit arrangement without departing from the spirit or scope of the invention.

It is to be further noted that the application of this invention need not be confined to monostable or bistable devices, but may also be used in any circuit where it is desired to control the peaks of the characteristic curves.

I claim:

1. A transistor circuit comprising a transistor having an emitter, a collector, and a base, a first resistor, a first substantially constant direct current source of potential and a second resistor connected in the order named between the base and the emitter; said first resistor, a second substantially constant direct current source of potential and a third resistor being connected between said base and said collector; a third substantially constant direct current source of potential and a diode poled to oppose conduction of said third source connected in series across said first resistor; and a fourth substantially constant direct current source of potential and a second diode poled to permit conduction of said fourth source connected in series across said first resistor.

2. A transistor circuit comprising a transistor having an emitter, a collector, and a base, a first variable resistor, a first substantially constant direct current source of potential and a resistor connected in the order named between the base and the emitter, said first variable resistor; a second substantially constant direct current source of potential and a second variable resistor being connected between said base and said collector, a third substantially constant direct current source of potential and a diode poled to oppose conduction of said third source connected in series across said first variable resistor, and a fourth substantially constant direct current source of potential and a second diode poled to permit conduction of said fourth source connected in series across said first variable resistor.

References Cited in the file of this patent

UNITED STATES PATENTS

| | | |
|---|---|---|
| 2,579,336 | Rack | Dec. 18, 1951 |
| 2,629,934 | Trent | Feb. 24, 1953 |
| 2,644,896 | Lo | July 7, 1953 |
| 2,644,897 | Lo | July 7, 1953 |
| 2,724,061 | Emery | Nov. 15, 1955 |

OTHER REFERENCES

Proceedings of the IRE, November 1952, volume, 40, #11, pages 1398–1400.